(12) United States Patent
Tranovich et al.

(10) Patent No.: US 10,199,912 B2
(45) Date of Patent: Feb. 5, 2019

(54) TORQUE MOTOR WITH MECHANICAL FLEXURES ESTABLISHING ARMATURE-TO-FIELD GAPS

(71) Applicant: Woodward HRT, Inc., Santa Clarita, CA (US)

(72) Inventors: Stephen J. Tranovich, Valencia, CA (US); Kumaraguru Poonamalli Palani, Valencia, CA (US)

(73) Assignee: Woodward HRT, Inc., Santa Clarita, CA (US)

( * ) Notice: Subject to any disclaimer, the term of this patent is extended or adjusted under 35 U.S.C. 154(b) by 484 days.

(21) Appl. No.: 15/006,698

(22) Filed: Jan. 26, 2016

(65) Prior Publication Data

US 2017/0214305 A1    Jul. 27, 2017

(51) Int. Cl.
| | | |
|---|---|---|
| *H01F 7/14* | (2006.01) | |
| *H02K 7/00* | (2006.01) | |
| *H02K 15/00* | (2006.01) | |
| *H02K 26/00* | (2006.01) | |

(52) U.S. Cl.
CPC ............. *H02K 26/00* (2013.01); *H01F 7/145* (2013.01); *H02K 7/00* (2013.01); *H02K 15/00* (2013.01)

(58) Field of Classification Search
CPC .......... H02K 26/00; H02K 15/00; H02K 7/00; H02F 7/145
USPC .................................................. 310/42, 429
See application file for complete search history.

(56) References Cited

U.S. PATENT DOCUMENTS

| | | | |
|---|---|---|---|
| 3,678,951 A | * | 7/1972 | Coakley ................... F15C 3/12 137/14 |
| 4,017,706 A | | 4/1977 | Aubrecht et al. |
| 4,293,835 A | * | 10/1981 | Davis ..................... H01H 71/04 335/126 |
| 4,442,855 A | * | 4/1984 | Hoffman, Jr. ............. F15C 3/10 137/83 |
| 5,679,989 A | | 10/1997 | Buscher et al. |
| 6,344,702 B1 | | 2/2002 | Rodriguez et al. |
| 2015/0270748 A1 | | 9/2015 | De La Chevasnerie et al. |

FOREIGN PATENT DOCUMENTS

| | | |
|---|---|---|
| EP | 1168382 A1 | 1/2002 |
| EP | 2922071 A1 | 9/2015 |

* cited by examiner

*Primary Examiner* — Quyen P Leung
*Assistant Examiner* — Minki Chang
(74) *Attorney, Agent, or Firm* — BainwoodHuang

(57) ABSTRACT

A torque motor has a mechanical reference member, an armature, and a field assembly. The field assembly includes field pole pieces defining a pole opening, and the armature is mounted to the mechanical reference member for rotation about a motor axis and extends into the pole opening with respective gaps to the field pole pieces. The field assembly is secured to the mechanical reference member and spaced therefrom by elastically deformable flexures, deformed sufficiently to locate the armature at a predetermined position within the pole openings with corresponding lengths of the gaps. During manufacture, a load can be applied to move the field assembly relative to the mechanical reference member against the deformation force of the flexures to locate the pole opening relative to the armature pole piece such that the gaps of desired lengths are formed.

20 Claims, 4 Drawing Sheets

TORQUE MOTOR WITH MECHANICAL FLEXURES ESTABLISHING ARMATURE-TO-FIELD GAPS

BACKGROUND

A limited-angle torque motor can be used in many applications, such as the first stage of an electrohydraulic servovalve. A torque motor converts an electrical current (e.g., on the order of tens of milliamps) into a torque or force that accomplishes mechanical work, such as positioning a flapper or jet in a servovalve. A typical torque motor of this type includes, at a minimum, an armature assembly and a field assembly. The field assembly is a fixed magnetic circuit having an arrangement of pole pieces constructed of magnetically soft material to direct flux from one or more permanent magnets into a pair of pole openings. The armature is flexibly mounted to the torque motor structure for rotation about a motor axis. Each end of the armature extends into a respective pole opening, forming respective gaps to the field pole pieces. The armature is surrounded by one or more coils of wire which are excited by the electrical current from an electronic amplifier. The armature is mechanically coupled to an object to be moved, such as a flapper or jet, with a range of motion corresponding to the limited angular travel of the armature with respect to the magnetic poles. The magnetic circuit is highly sensitive to the lengths of the gaps between the armature and the poles since imbalanced forces induced by magnetic attraction between the armature and the pole faces introduce a magnetic bias that displaces the mechanical output relative to its desired mechanical rest position.

SUMMARY

The present disclosure describes a mechanism for setting armature-to-pole air gaps in a limited-angle torque motor. As is known by those skilled in the art, the initial rotational position of a torque motor with no current applied (referred to as its "null position") can be very sensitive to the relative position of the armature and the poles, due to magnetic attraction developed between the armature and the poles. In cases where the null position is not correct, a current must be applied to the torque motor coils to drive the motor to the correct position (referred to as "null current"), and is a typical specification parameter for application of a torque motor. In many embodiments, all gaps are ideally identical, and thus the null position is achieved with zero current through the coils. Very small asymmetry of upper and lower gaps on one or both sides of the torque motor may require a null current of some much larger value, which may be well beyond the null requirement of an application. It is therefore required to set the gaps very accurately during torque motor manufacture. In other embodiments there may be intentional differences between the gap lengths so as to set a non-zero null position. In these embodiments, the gaps must still be precisely adjusted to provide the required null position.

It may be possible to accomplish the setting of the magnetic null by various means, such as use of shims under the magnetic circuit components, electrical discharge machining of the gaps in an assembled motor, the use of a deformable pole structure, or repositioning (such as by tapping screw clamped components) the magnetic components in the motor during buildup. Such methods have inherent disadvantages. The use of shims involves additional components and a manual process that may require multiple iterations to achieve the required dimensions. Electrical discharge machining is a relatively slow batch-type process which can require an extensive investment in machinery if the torque motors are to be manufactured in high quantity. The deformable pole structure requires a highly variable manual process, commonly requiring the application of large amounts of force in locations near very delicate components. Re-positioning screw-clamped components is generally a manual, labor intensive process.

Thus the present disclosure is directed to a mechanism and process for precisely adjusting the positions of the torque motor poles relative to the armature so as to achieve the desired null current. This may be accomplished with no additional components. The process is a single-piece flow that can be automated, meaning that the process is suitable to a single part at one time, and does not require batches of parts to be economical.

More particularly, a torque motor is disclosed having a mechanical reference member, an armature, and a field assembly. The field assembly includes field pole pieces defining poles and a pole opening between them. The armature may be part of an armature assembly also including one or more mechanical springs coupling the armature to the mechanical reference member to allow for rotation of the armature about a motor axis. Two ends of the armature extend into respective pole openings, forming gaps therefrom to the respective field pole pieces. The field assembly is spaced from the mechanical reference member by a set of deformable flexures. The flexures are deformed sufficiently to locate the armature pole piece at a predetermined position within the pole opening with corresponding predetermined lengths of the gaps.

The field assembly may be secured to the mechanical reference member with one or more fasteners, such as bolts extending through the field assembly and into the mechanical reference member. In one embodiment, the deformable flexures are displaced beyond their elastic limit (plastically deformed) during adjustment and any loads applied in assembly or service are much less than the elastic load limit of the flexures. Thus the flexures are permanently deformed to provide an adjusted location for the mechanical reference member. In a second embodiment, the flexures are deformed within their elastic limit by application of an external load such as torque motor assembly screws, and are adjustable within the range of flexure elasticity. A third embodiment combines elastic and plastic deformation of the flexures. In one embodiment, the mechanical reference member is a disk-shaped base at one axial end of the torque motor.

During manufacture, a load can be applied to move the field assembly relative to the mechanical reference member against the deformation force of the flexures to locate the pole opening relative to the armature pole piece such that the gaps of desired sizes are formed. Alternatively, the starting gaps can be measured and the field assembly subsequently removed so as to allow permanent adjustment of the flexures at higher force loads which cannot be transmitted thorough the field assembly. The manner of loading as well as the amount of movement of the field assembly can be accomplished in a variety of manners. Examples are described herein.

In some embodiments, the predetermined position of the armature pole piece is a centered position in which the gaps are of equal length. This generally corresponds to a centered position for the motor null position with zero input current. In alternative embodiments it may be desired to intentionally include non-zero mechanical offset, for example to counteract any bias forces or other known offsets that may be present in the system or to provide a fail-safe condition in the event of loss of electrical input.

The flexures may be unitary with or mechanically separate from the mechanical reference member. Unitary flexures may be formed as thin members that deform axially. These may be remaining portions of material after removal of material from the mechanical reference members to form respective back-side hollows of the flexures. Unitary flexures may also include trepanned button-like members extending from the thin concave members and against which the field assembly rests.

In another embodiment, the flexures may be thin members that deform axially as described above, but the load from clamping the field assembly to the mechanical reference member is transmitted to the flexures through additional, essentially non-deformable parts, such as spherical steel balls, eliminating the need to machine the button-like members described above. In this embodiment, the machining of the mechanical reference member to form the flexures may include forming wells for receiving the spheres and maintaining them in place. It should be apparent to those skilled in the art that there are a variety of shapes and materials that could be used to transmit the load from the field assembly to the flexures machined in the mechanical reference member without departing from the teachings of this invention.

Alternatively the flexures may include separate elastically or plastically deformable members disposed between the field assembly and the mechanical reference member. In one embodiment the deformable members include spheres made of a deformable material. The mechanical reference member may include wells for receiving the spheres and maintaining them in place, although no flexures would be machined into the mechanical reference member in this embodiment.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

The present disclosure describes a mechanism for setting armature-to-pole air gaps in a limited-angle torque motor. As is known by those skilled in the art, the initial rotational position of a torque motor with no current applied (referred to as its "null position") can be very sensitive to the relative position of the armature and the poles, due to magnetic attraction developed between the armature and the poles. In cases where the null position is not correct, a current must be applied to the torque motor coils to drive the motor to the correct position (referred to as "null current"), and is a typical specification parameter for application of a torque motor. In many embodiments, all gaps are ideally identical, and thus the null position is achieved with zero current through the coils. Very small asymmetry of upper and lower gaps on one or both sides of the torque motor may require a null current of some much larger value, which may be well beyond the null requirement of an application. It is therefore required to set the gaps accurately during torque motor manufacture. In other embodiments there may be intentional differences between the gap lengths so as to set a non-zero null position. In these embodiments, the gaps must still be precisely adjusted to provide the required null position.

Some methods that have been used to accomplish the setting of the magnetic null in the prior art include use of shims under the magnetic circuit components, electrical discharge machining of the gaps in an assembled motor, the use of a deformable pole structure, or repositioning (such as by tapping screw clamped components) the magnetic components in the motor during buildup. Such methods have inherent disadvantages. The use of shims involves additional components and a manual process that may require multiple iterations to achieve the required dimensions. Electrical discharge machining is a relatively slow batch-type process which can require an extensive investment in machinery if the torque motors are to be manufactured in high quantity. The deformable pole structure requires a highly variable manual process, commonly requiring the application of large amounts of force in locations near very delicate components. Re-positioning screw-clamped components is generally a manual, labor intensive process.

Thus the present disclosure is directed to a mechanism and process for precisely adjusting the positions of the torque motor poles relative to the armature so as to achieve the desired null current. This may be accomplished with no additional components. The process is a single-piece flow that can be automated, meaning that the process is suitable to a single part at one time, and does not require batches of parts to be economical.

Figure 1:
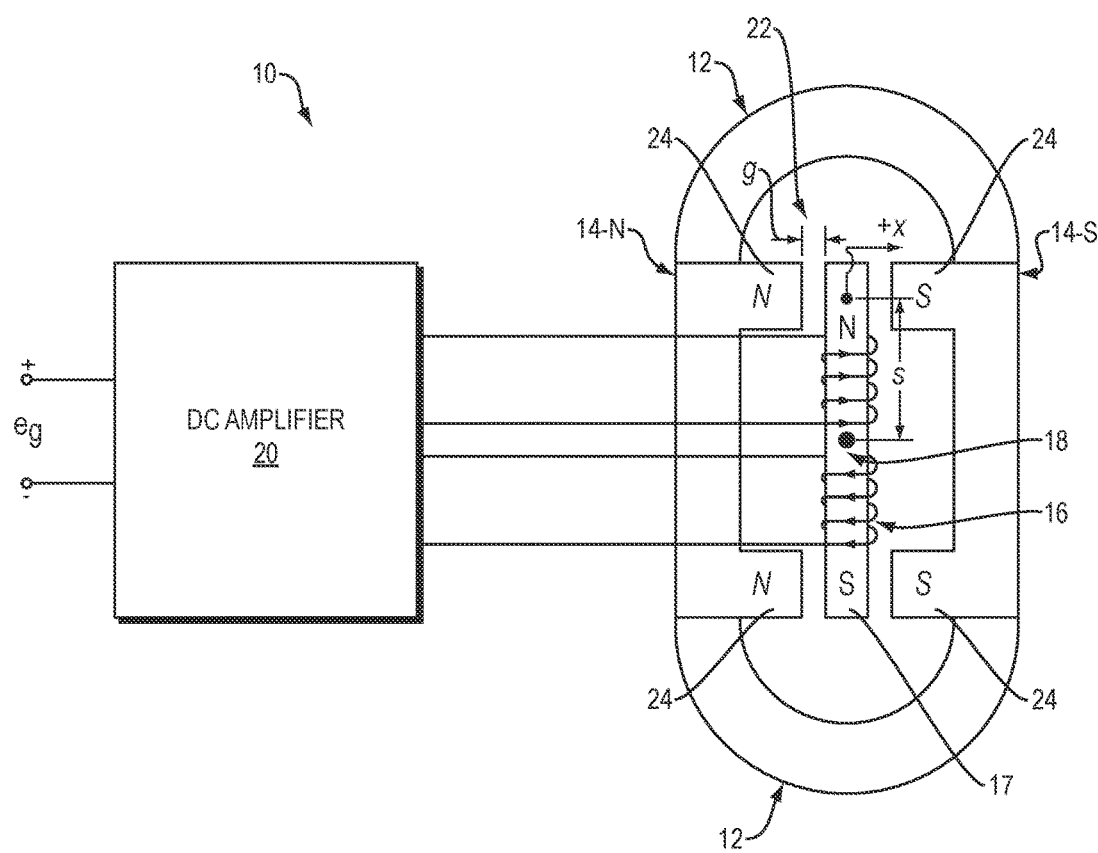
FIG. 1 is a schematic diagram of a torque motor.

FIG. 1 is a schematic diagram of a torque motor 10. Electromagnetic components include a field assembly having a pair of permanent magnets 12 as well as magnetically permeable north (N) and south (S) pole pieces 14-N, 14-S, and a magnetically permeable armature 17 with a pair of electrical coils 16 wrapped thereon. In the illustrated embodiment the magnets 12 and pole pieces 14 are stationary, and the armature 17 is mounted to a torsion spring pivot 18 for rotation relative to the pole pieces 14. The axis of rotation is a line extending through the torsion spring pivot 18 perpendicular to the plane of FIG. 1. A DC amplifier 20 provides electrical current to the coils proportional to an input command $e_g$. As is well known to those skilled in the art, the coils may be interconnected in series, parallel, or a push-pull configuration or the amplifier may provide independent signals to each coil, depending upon the application. FIG. 1 also shows gaps 22 between the pole 24 of the field pole pieces 14 and respective end portions of the armature 17. These are the areas of magnetic interaction between the field assembly and the armature 16 during operation. Not shown is the mechanical connection to the load to be driven by the torque motor.

Figure 2:
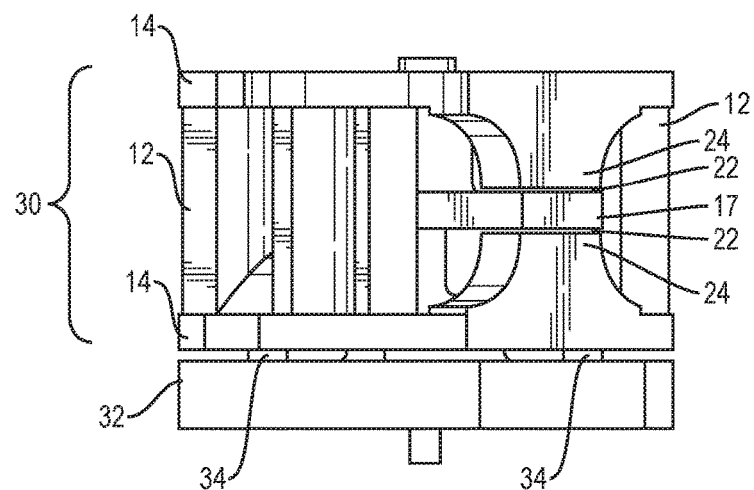
FIG. 2 is an elevation view of a torque motor.

FIG. 2 is a mechanical elevation diagram of selected magnetic components of the torque motor 10, including the armature 17 (end portion visible) and a field assembly 30, both mounted to a base 32 which is also referred to herein as a "mechanical reference member". The coils 16 are not shown for clarity. The term "assembly" is used for convenient reference and does necessarily signify that the components of the field assembly 30 are actually preassembled into a unitary assembly prior to assembly with the armature assembly (defined below). This term does reflect that the components of the field assembly move together as a unit during adjustment of the gaps 22 as described herein.

One (visible) end of the armature 17 is disposed within a respective pole opening defined by the poles 24 of the pole pieces 14. Although not visible in this view, this same configuration exists at the other (diametrically opposite) end of the armature 17. The armature 17 is mounted to a thin tubular spring 40 to allow limited-angle rotation within the field assembly 30 about a central horizontal axis perpendicular to the long axis of the armature 17 in FIG. 2. The bottom of the tubular spring (not visible) is securely attached to the base 32. A pipe 42 (only partially visible) is connected to the armature 17 such that rotation of the armature on its axis causes displacement of the pipe, which provides the connection to the load to be driven by the torque motor (such as a hydraulic jet in a servovalve). An armature assembly (shown with reference 45 in FIG. 6) includes the armature 17, the spring 40 and the pipe 42.

A bottom surface of the field assembly 30 rests against deformable mechanical flexures 34 of the base 32. As explained more below, the flexures 34 provide a desired vertical spacing of the field assembly 30 from the base 32. As the armature 17 has an established mechanical location relative to the base 32, the flexure-provided spacing of the field assembly 30 accurately locates the pole opening in relation to the armature 17 in the vertical direction, establishing the lengths of the gaps 22 and achieving corresponding desired mechanical and electrical characteristics of the torque motor 10. For example, the armature 17 may be located with its end portions precisely in the center of the respective pole openings so that the gaps 22 are all of equal length, which may minimize null-position current as explained above.

Figure 3:
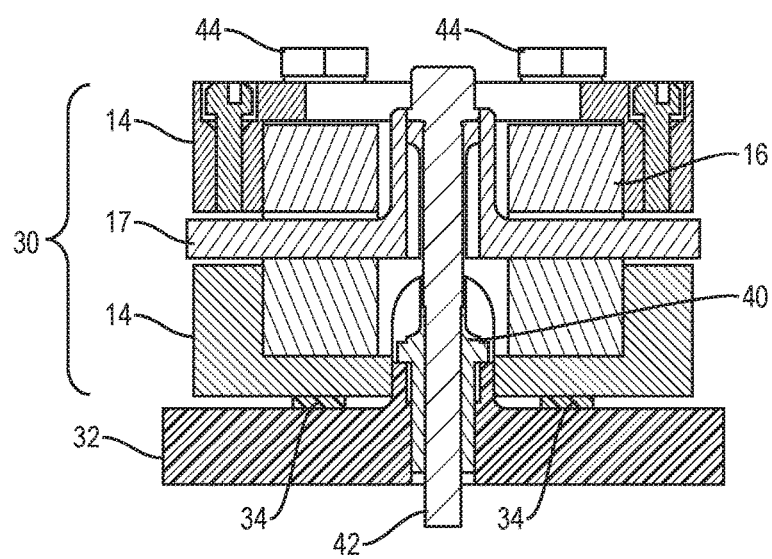
FIG. 3 is a sectional elevation view of a torque motor.

FIG. 3 shows the torque motor 10 in cross section. The armature assembly is securely mounted to the base 32 by press fit, welding, brazing, or other well-known methods of attachment. The coils 16 are shown in position around the armature 17. Bolts 44 pass through the field pole pieces 14 to secure the field assembly to the base 32, with the lower pole piece 14 urged against the flexures 34.

Figure 4:
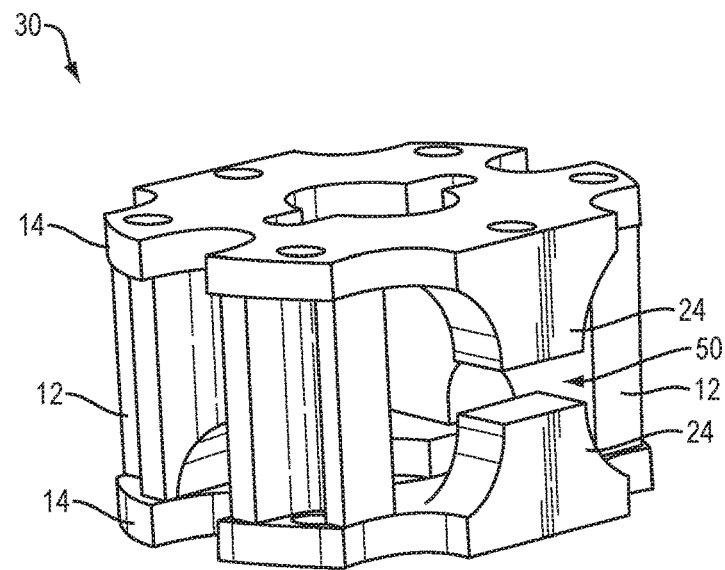
FIG. 4 is an isometric view of a field assembly.

FIG. 4 shows the field assembly 30 including the two permanent magnets 12 and two pole pieces 14. In manufacturing, the height of the pole pieces 14 above the pole frame (the magnet bearing surface) and the overall height of the magnets 12 are held within tight tolerances in order to provide substantially equal pole openings 50 on each side (for respective ends of the armature pole piece 17). As an example, the tolerances may be on the order of less than 0.0005 inches. Because the pole openings 50 are so closely matched, obtaining desired-length pole gaps 22 therefore is done by adjusting the position of the field assembly 30 relative to the armature 17, which is affixed to the torque motor base 32 as described above.

Figure 5:
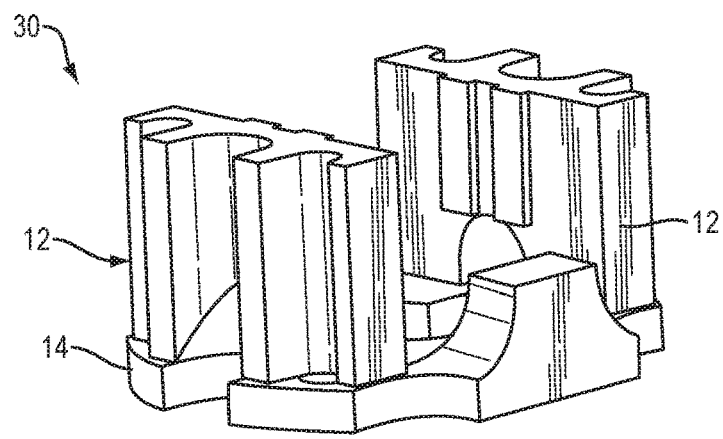
FIG. 5 is an isometric view of a field assembly with an upper pole piece removed.

FIG. 5 shows the field assembly 30 with upper pole piece 14 removed, better illustrating the interface with the permanent magnets 12.

Figure 6:
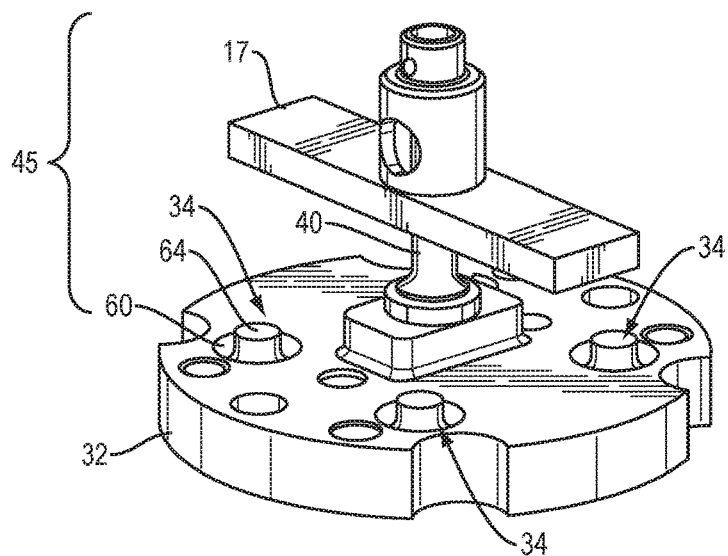
FIG. 6 is an isometric view of an armature mounted to a base.

FIG. 6 shows the armature assembly 45 as attached to the base 32 with the coils 16 and the field assembly 30 removed. Four flexures 34 are located in the base 32 at corners of an imaginary rectangle. In alternative embodiments other arrangements may be used. It will be appreciated that arrangements having symmetry along and across the rotational axis will be preferred. The top surface of the flexures 34 can be seen to have trepanned grooves 60 surrounding button-like members 64 that extend upwardly.

Figure 7:
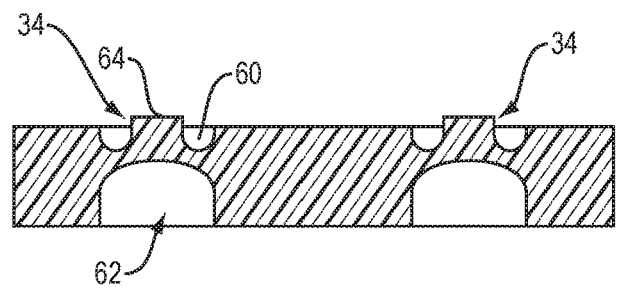
FIG. 7 is a sectional view of a portion of a base showing deformable flexures.

FIG. 7 shows two of the flexures 34 in cross section. The top of each flexure has a trepanned groove 60 surrounding button-like members 64 that extend up from the base (against which the bottom pole piece 14 of the field assembly 30 rests) and a respective hollow with a concave end 62 at the bottom, which results in a thin cross section that can be deflected to adjust the torque motor gaps. This thin cross-sectional structure provides the desired axial stiffness and predictable elastic and plastic deflection. It will be appreciated that this structure can be made by metal injection molding or milling (machining) for example.

Referring to FIGS. 4 through 7, during assembly the bottom pole piece 14 of the field assembly 30 rests on the four flexures 34, specifically against the button-like extensions 64. The convex sections 60 are designed such that the total yield force (plastic deformation load) across all flexures 34 is higher than the load applied by the bolts 44 (FIG. 3) or other means used to secure the two assemblies together. Thus, tightening of the bolts 44 results in deformation of the flexures 34 (specifically, of the convex sections 60 in the downward direction) only within an elastic range. This way, a balance of mechanical forces is maintained indefinitely that results in precise location of the armature pole piece 17 within the pole opening 50.

Use and Adjustment of Flexures:

For purposes of this description, the two sides of the torque motor (corresponding to respective ends of the armature 17) are referred to as the C1 side and the C2 side. Also, an embodiment employing a press is described, but it will be appreciated that this description can be applied to other ways of bringing about the required deformation of the flexures.

1. The initial position of the pole opening 50 is high (biased away from the torque motor base 32). The flexures 34 will be deformed (downward in the Figures) to move the field assembly 30 toward the base 32 and thereby center the armature 17 in the pole opening 50.

2. The torque motor parts that define the pole opening and the armature position therein (armature assembly 45, base 32, and field assembly 30) are assembled for measurement of the initial gaps. The parts may be temporarily assembled for measurement and then disassembled for adjustment of the flexures 34. Alternatively, the parts may be assembled complete with coils, fasteners, and ancillary parts so that no disassembly is required. The biased-position gaps 22 are measured and a computation is made of the displacement required to center the armature pole piece 17 therein (e.g., to make the gaps 22 of equal length).

3. The pole opening measurement may be accomplished optically, using a commercially available microscope device, or any device capable of measuring to adequate precision without disturbing the position of the armature 17. The calculation of the displacement required to position the armature 17 in the pole opening 50 may be conducted automatically and the required displacement provided electronically. In one embodiment a pressing machine may be used. Computation of the displacement values for the pressing operation requires that any compliance of the press be considered in the calculation, as well as the spring back due to the elastic deformation of the flexure. The flexures 34 may be initially pressed to the point of plastic deformation to characterize the individual flexure characteristics (which may vary due to manufacturing tolerances). Final press parameters can then be calculated using the measured values. The calculation should also account for any horizontal distance between the location of the measured gaps and the flexures.

4. The computed final displacement values are entered into a precision press. The press then plastically deforms the flexures to the correct height for the field assembly after any springback. In one embodiment, a single pressing operation is undertaken on each of the C1 and C2 sides of the torque motor while the motor is completely assembled. Generally, it is advantageous to deform two flexures 34 in a single pressing operation on each of the C1 and C2 sides, although the flexures can be pressed individually.

6. The torque motor is then assembled (if required) with the correct gap setting. If desirable for a specific application, it is possible to make fine adjustments to the gaps using the torque on the four torque motor bolts 40, while maintaining clamping forces within the elastic deformation range of the flexures.

There are numerous other methods for making fine adjustments to the null position of the torque motor after a torque motor incorporating the teachings of this disclosure has been assembled and the gaps set. For example, other mechanisms known to those skilled in the art include mechanical springs, auxiliary magnets, deformable structures, adjustment screws and many others.

Another embodiment of the gap setting process utilizes the four torque motor bolts 44 to deform the flexures 34. In this embodiment, the yield stress of the flexures 34 must be less than the allowable load of the torque motor bolts 40, and less than the allowable load from the top pole piece 14 through the magnets 12. In this embodiment, the gap adjustment process can be monitored optically in real time as the adjustment is made, or by mechanical means such as a position sensor on the top pole piece 14. The torque motor bolts are then tightened in sequence until the correct gap spacing is achieved, and then relieved of enough torque to move from the plastic to the elastic deflection range of the flexures.

In the illustrated embodiment, the flexures 34 are machined into the base 32. The top surface of the base 32 is machined with a trepan and the bottom surface with a mating hole for each flexure 34, as is shown in the cross section of FIG. 7. The resulting thin concave section 60 is sized to provide the desired elastic spring rate and plastic deformation force. Numerous alternative embodiments of flexure designs are possible.

Figure 8:
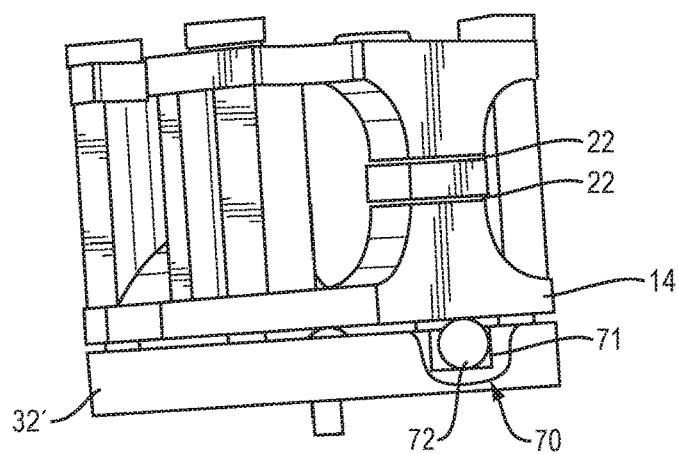
FIG. 8 is an isometric view of a torque motor.

FIG. 8 illustrates an example of another type of embodiment in which flexures are machined into the base that do not incorporate the button-like extension 64. Instead, a separate part can be incorporated to transfer the load from the bottom of the field assembly to the base. In the example of FIG. 8, the base 32' is shown in phantom. Four alternative flexures 70 are machined into the base 32'. These flexures incorporate a thin wall at the bottom of a well 71 designed to hold captive a ball 72. The ball 72 can be a substantially non-compressible solid ball such as a steel bearing ball. The ball 72 then transfers the load from the lower pole piece 14 to the flexure 70. The advantage of this approach is simplification of the flexure machining, at the expense of additional parts. It can be seen by those skilled in the art that there are many possible designs for a separate load transfer medium to replace the ball 72 in this embodiment, such as cylindrical pins with various end configurations.

In another embodiment, also represented by FIG. 8, the flexures 70 could have a separate flexure medium (represented by the ball 72) as the elastic member. In this embodiment, the substantially non-compressible ball material is replaced by a material capable of suitable plastic deformation under load to provide corresponding adjustable spacing of the field assembly 30 to the base 32', and thereby adjustable spacing of the gaps 22. In this embodiment, the well 71 would not have a corresponding machined well from the backside of the base 32' as is illustrated, but would instead be solid under the base so that the deformable separate flexure medium would compress under load instead of a feature of the base 32'. While the ball illustrates one possible separate flexure shape, it will be recognized by those skilled in the art that many shapes are possible for this embodiment.

While various embodiments of the invention have been particularly shown and described, it will be understood by those skilled in the art that various changes in form and details may be made therein without departing from the scope of the invention as defined by the appended claims.

What is claimed is:

1. A torque motor comprising:
a mechanical reference member;
an armature flexibly mounted to the mechanical reference member for rotation about a motor axis; and
a field assembly including field pole pieces defining a pole opening into which the armature extends with respective gaps to the respective field pole pieces, the field assembly being spaced from the mechanical reference member by a set of deformable flexures, the flexures being deformed sufficiently to locate the pole opening at a predetermined position relative to the armature with corresponding predetermined lengths of the gaps, the field assembly being urged into contact with the deformable flexures and secured to the mechanical reference member by one or more fasteners.

2. The torque motor of claim 1, wherein the deformable flexures are elastically deformed below their yield stress.

3. The torque motor of claim 1 wherein the deformable flexures are elastically and plastically deformed.

4. The torque motor of claim 1 wherein the fastener clamping force is adjusted to change the load applied to the deformable flexures whereby adjustments are made to the lengths of the gaps.

5. The torque motor of claim 1, wherein the predetermined position is a centered position in which the gaps are of equal length.

6. The torque motor of claim 1, wherein the fasteners are bolts extending through the field assembly and into the mechanical reference member.

7. The torque motor of claim 1, wherein the mechanical reference member is a base at one axial end of the torque motor.

8. The torque motor of claim 1, wherein the flexures are unitary with the mechanical reference member.

9. The torque motor of claim 8, wherein the flexures are formed as thin concave members that deform axially.

10. The torque motor of claim 9, wherein the thin concave members are remaining portions of base material after removal of material to form respective back-side hollows of the flexures.

11. The torque motor of claim 10, wherein the flexures include trepanned button-like members extending from the thin concave members and against which the field assembly rests.

12. The torque motor of claim 9, wherein the flexures include trepanned button-like members extending from the thin concave members and against which the field assembly rests.

13. The torque motor of claim 8, wherein load is transferred from the field assembly to the flexures by load transfer means that is not unitary to the mechanical reference member.

14. The torque motor of claim 13 wherein the load transfer means is a non-compressible ball.

15. The torque motor of claim 1, wherein the flexures comprise separate deformable members disposed between the field assembly and the mechanical reference member.

16. The torque motor of claim 15, wherein the deformable members include spheres made of an elastically deformable material.

17. The torque motor of claim 16, wherein the mechanical reference member includes wells for receiving the spheres and maintaining them in place.

18. The torque motor of claim 1, wherein:
the torque motor has an overall cylindrical shape symmetric about the motor axis;
the pole opening is a first one of two pole openings at diametrically opposite locations of the field assembly; and
the armature has respective end portions each located in a respective one of the pole openings.

19. The torque motor of claim 1, wherein the mechanical reference member is a disk-shaped base at one axial end of the torque motor, and wherein the flexures are corresponding portions of the disk-shaped base located at respective angular positions about the motor axis.

20. The torque motor of claim 19, wherein the portions of the disk-shaped base are thinned portions that deform axially relative to remaining portions of the disk-shaped base.

* * * * *